United States Patent
Luo et al.

(10) Patent No.: US 7,136,552 B2
(45) Date of Patent: Nov. 14, 2006

(54) TO-PACKAGED OPTIC-FIBER RECEIVING INTERFACE AND METHOD

(75) Inventors: Xin Simon Luo, Monterey Park, CA (US); Bryon Lynn Kasper, San Marino, CA (US); Nghia Kha, Baldwin Park, CA (US); Xiaoming Lou, Alhambra, CA (US)

(73) Assignee: Emcore Corporation, Somerset, NJ (US)

( * ) Notice: Subject to any disclaimer, the term of this patent is extended or adjusted under 35 U.S.C. 154(b) by 0 days.

(21) Appl. No.: 10/465,300

(22) Filed: Jun. 19, 2003

(65) Prior Publication Data

US 2004/0258369 A1   Dec. 23, 2004

(51) Int. Cl.
*G02B 6/32* (2006.01)
(52) U.S. Cl. .................. 385/35; 385/33; 385/52; 385/88; 385/92; 385/93; 385/49
(58) Field of Classification Search ........... 385/31–33, 385/35, 147, 93, 52, 88, 89, 92, 14, 49, 34
See application file for complete search history.

(56) References Cited

U.S. PATENT DOCUMENTS

| | | | |
|---|---|---|---|
| 5,066,089 A * | 11/1991 | Greil et al. ............ 385/35 |
| 5,457,557 A | 10/1995 | Zarem et al. | |
| 5,963,694 A * | 10/1999 | Fujimura et al. ........... 385/88 |
| 5,963,696 A * | 10/1999 | Yoshida et al. ............ 385/91 |
| 6,353,491 B1 | 3/2002 | Tanaka et al. | |
| 6,409,398 B1 * | 6/2002 | Nakaya et al. ............ 385/93 |
| 6,693,312 B1 | 2/2004 | Dietrich et al. | |
| 6,731,882 B1 | 5/2004 | Althaus et al. | |
| 2001/0026574 A1 | 10/2001 | Yagi | |
| 2002/0141142 A1 * | 10/2002 | Rookes .................. 361/538 |
| 2003/0020998 A1 * | 1/2003 | Kuczynski .............. 359/245 |
| 2003/0047674 A1 * | 3/2003 | Thornburn et al. .... 250/231.13 |
| 2003/0147601 A1 * | 8/2003 | Bartur et al. ............ 385/92 |
| 2003/0223727 A1 * | 12/2003 | Soskind et al. .......... 385/140 |
| 2004/0017977 A1 | 1/2004 | Lam et al. | |
| 2004/0085526 A1 * | 5/2004 | Gogolla et al. ........ 356/4.01 |
| 2004/0151442 A1 | 8/2004 | Scruggs et al. | |

* cited by examiner

*Primary Examiner*—Brian M. Healy
(74) *Attorney, Agent, or Firm*—Christie, Parker & Hale, LLP

(57) ABSTRACT

An optical interface between an optical fiber and a photodiode is provided. The optical fiber has an end. The optical interface includes a lens located such that a chief ray of an optical signal outputted at said end traverses a center of the lens. The lens may be a ball lens or a lens having an orientation such that the chief ray is incident substantially normal to a center of the lens.

27 Claims, 6 Drawing Sheets

TO-PACKAGED OPTIC-FIBER RECEIVING INTERFACE AND METHOD

CROSS-REFERENCE TO RELATED APPLICATIONS

This application contains subject matter related to the subject matter disclosed in a commonly owned U.S. Patent Application entitled "An Opto-Electronic TO-Package and Method for Laser" (U.S. patent application Ser. No. 10/465,276 now U.S. Pat. No. 7,011,455) filed on Jun. 19, 2003.

BACKGROUND

In a receiver optical sub-assembly (ROSA), a photodiode chip packaged in a transistor outline (TO) can (or package) is typically used to detect optical signals received over an optical fiber. In a conventional TO can for receiving optical signal at a transmission rate of 10 Gbps (Giga bits per second) or higher, the photodiode chip is located at the center of the TO header. Such centering of the photodiode chip allows the active area of the photodiode chip to be co-axial to the optical fiber. However, limiting the location of the photodiode chip to the center of the TO can results in an inflexible configuration. In such at-the-center photodiode chip configuration, it may be difficult to place other components at locations that will reduce distance between them or to the leads for wire bonding, for example.

In addition, when the photodiode chip is co-axial with the optical fiber, relatively high return loss typically results due to reflection of the optical signal that interferes with the optical output of the optical fiber. The edge of the optical fiber is often slanted at an angle to reduce the reflection incident upon the optical fiber. However, such slanting of the edge typically results in low optical coupling efficiency, for example, due to resulting optical aberration when the chief ray of the optical signal is bent as it passes through the periphery of the lens.

SUMMARY OF THE INVENTION

In an exemplary embodiment in accordance with aspects of the present invention, an optical interface between an optical fiber having an end and a photodiode is provided. The optical interface comprises a lens located such that a chief ray of an optical signal outputted at said end traverses a center of the lens.

In another exemplary embodiment in accordance with aspects of the present invention, an optical assembly is provided. The optical assembly comprises: an optical fiber having a core and an end; a photodiode having an active area; and a lens disposed between the optical fiber and the photodiode, the lens being located such that a chief ray of an optical signal outputted at said end traverses a center of the lens.

In yet another exemplary embodiment in accordance with aspects of the present invention, a method of using a photodiode having an active area to detect a chief ray of an optical signal outputted at an end of an optical fiber is provided. The method comprises: slanting said end of the optical fiber such that the chief ray is outputted at an angle with respect to surface of said end; and placing the photodiode such that the chief ray can be incident on the active area of the photodiode substantially unbent.

In still another exemplary embodiment in accordance with aspects of the present invention, in an optical assembly comprising an optical fiber and an opto-electronic device, a method of improving coupling efficiency between the optical fiber and the opto-electronic device is provided. The method comprises: slanting an edge of the optical fiber that optically interfaces with the opto-electronic device; and placing the opto-electronic device such that a chief ray of an optical signal can travel between said slanted edge of the optical fiber and the opto-electronic device substantially unbent.

These and other aspects of the invention will be more readily comprehended in view of the discussion herein and accompanying drawings.

DETAILED DESCRIPTION

In an exemplary embodiment in accordance with aspects of the present invention, optic-fiber receiver TO package (or TO can) having an off-center photodiode chip is provided. By placing the photodiode chip off the center of the TO package, a fabrication flexibility is realized for the TO can. By locating the photodiode chip at a suitable location, a high optical power coupling efficiency and a low return loss are realized for the TO package receiver optical sub-system. As a result, the receiver electrical performance may be improved.

Figure 1:
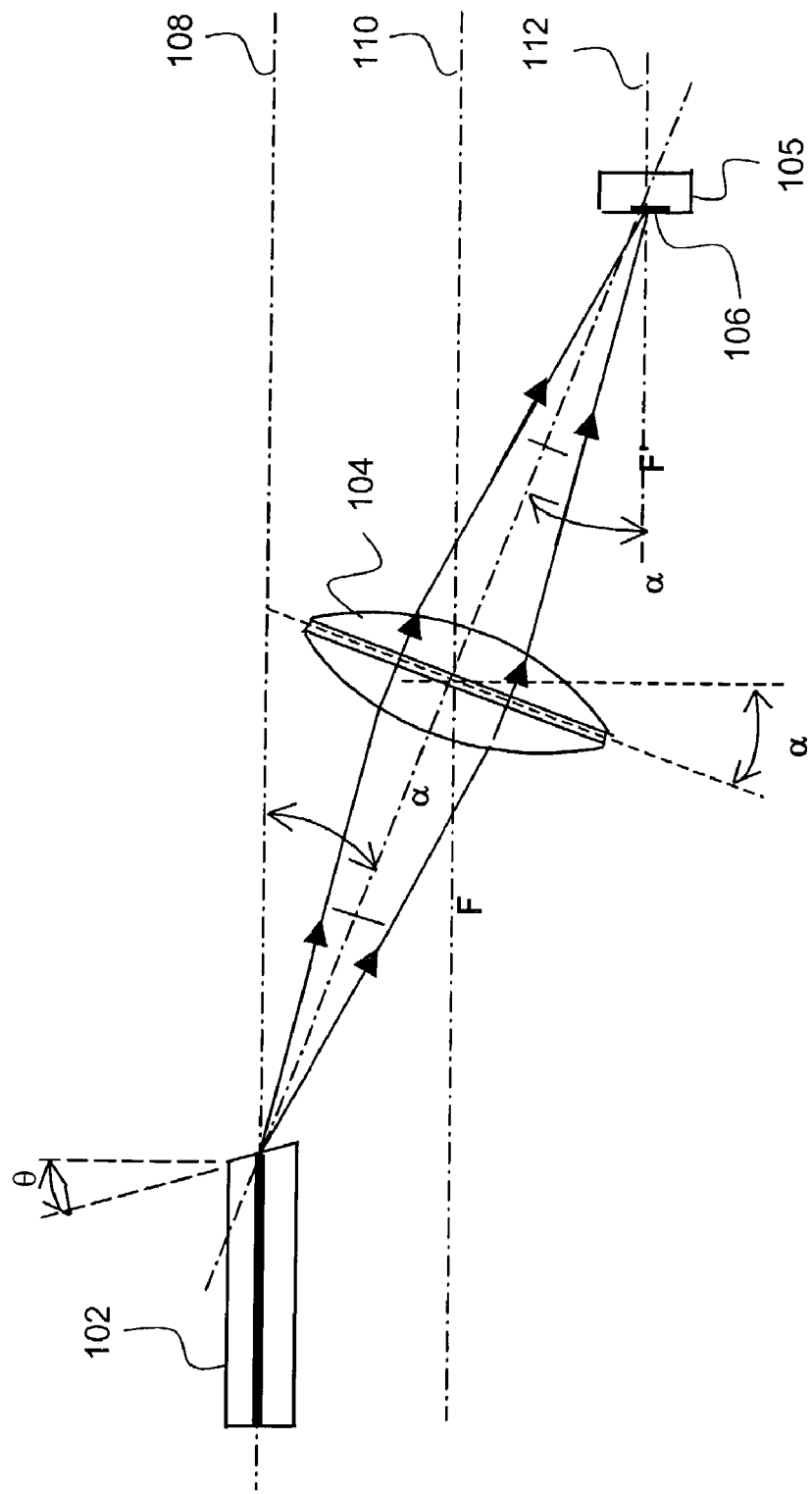
FIG. 1 is a schematic view of an optical interface between an optical fiber and a photodiode chip in an exemplary embodiment in accordance with aspects of the present invention.

FIG. 1 is a schematic view of an optical interface between an optical fiber 102 and a photodiode chip 105 in an exemplary embodiment in accordance with aspects of the present invention. The optical fiber 102 may be an end portion of a fiber optic cable or it may be a fiber stub enclosed in a receptacle (not shown). The fiber optic cable or the fiber stub for example may be SMF-28 or any other suitable optical fiber. When the optical fiber 102 is a fiber stub, the fiber stub and the receptacle together may also be referred to as an LC receptacle. In other embodiments, other types of receptacles, e.g., SC, MU, FC, and the like, may also be used. The end of the optical fiber 102 may be cleaved and/or polished at the end (or edge) to be slanted. For example, the angle at the end may be 8 degrees. Of course, the edge angle may be a suitable angle that is more or less than 8 degrees in other embodiments as will be described below.

The photodiode 105 may be any suitable photodiode that can detect optical signal at high bit rates, e.g., 10 Gbps or higher. The photodiode should be compatible with VCSELs that generate optical signals at 850 nanometer (nm) wavelength, edge emitting lasers that generate optical signals at 1310 and/or 1550 nm wavelength, DFB (distributed feedback) lasers and/or FP (Fabrey-Perot) lasers. For example, the photodiode 105 may be a PIN diode or an APD ("avalanche photodiode").

The optical interface includes a lens 104, which is a positive (i.e., converging) lens for focusing optical beam that passes therethrough. In the exemplary embodiment, a chief ray passes through the center of the lens 104, and is substantially unbent in the lens 104 after exiting the optical fiber end as the chief ray travels from the optical fiber 102 to the photodiode chip 105. The chief ray may be defined as a ray from an object that passes through the principal points in ray tracing, and is well known to those skilled in the art.

In the exemplary embodiment, the chief ray is in the optical axis, i.e., chief ray substantially overlaps (or substantially matches) the optical axis. This way, the aberration that may be caused by passing the chief ray through near the periphery (or away from the center) of the lens 104 (as in the case when the optical fiber end is slanted and the photodiode is at the center of the TO header) is reduced. Such on-axis operation results in high coupling efficiency because of reduction in aberration such as, for example, astigmatism and coma that may result from the off-axis operation (i.e., the chief ray passes through the periphery of the lens).

In the exemplary embodiment, the optical fiber and the active area (i.e., detection area) are not co-axial. In fact, a centerline 108 of the To header is substantially aligned with an axis of the optical fiber 102 (i.e., the fiber core), but a photodiode centerline 112 that goes through the center of the active area 106 of the photodiode chip 105 is offset from the TO header centerline 108. Between the TO header centerline 108 and the photodiode centerline 112 is a lens centerline 110 that traverses through the center of the lens 104.

The photodiode 105 for example is mounted on the TO header of the TO package, and the lens 104 may be mounted on a TO lens holder (not shown) of the TO package.

The optical fiber 102 is slanted (or cleaved) by angle theta (θ) at its output end (or edge). The slanted end of the optical fiber 102 is used to reduce the return loss created from the surface of the optical fiber end. The slant may be realized through polishing and/or cleaving. The optical signal being transmitted on the optical fiber 102, for example, may have a bit rate of 10 Gbps or higher. Due to the Snell's law, the chief ray of the optical beam is bent at an angle of α at the slant-ended optical fiber output and be sent into the lens 104 mounted on the TO lens holder (not shown). According to the Snell's law, the angle α is determined as follows: α=arcsin [sinθ/n_core] where n_core (index of refraction)= 1.4677 at 1310 nm, and 1.4682 at 1550 nm, for example.

In order to obtain a proper offset from the centerline 108 of the TO header, the lens 104 is located off from the centerline 108 of the TO header. Further, the lens 104 is tilted at an angle α with respect to a line that is perpendicular to the lens centerline 110 to allow the chief ray to pass through the lens center for decreasing the influence from the aberration associated with the lens 104. When the magnification in this optical system is selected to be about 1:1, the photodiode centerline 112 is twice as far from the TO header centerline 108 as the lens centerline 110. The incident chief ray with the same α angle illuminates the photodiode's active area 106 (size=~20 to 35 um diameter). In other embodiments, the magnification may be between about 0.8 to about 1.5. The spot size of the optical beam incident upon the active area 106 in the exemplary embodiment may be between approximately 9 μm and approximately 15 μm, for example. The spot size of the optical beam may be different in other embodiments.

In the exemplary embodiment illustrated in FIG. 1, the core of the optical fiber 102 is substantially aligned with the TO header centerline 108, and the lens centerline 110 is offset from the TO header centerline 108. In other embodiments, however, the lens centerline may be substantially aligned with the TO header centerline, and the core of the optical fiber may be offset by the same amount and in opposite direction (as the offset of the lens centerline 110 of FIG. 1) from the TO header centerline. In such case, the photodiode chip should also be moved to receive the chief ray on its active area. In other words, as long as the spatial relationship between the optical fiber, lens and photodiode is maintained, the TO header centerline may flexibly be substantially aligned with either the optical fiber centerline or the lens centerline.

In the exemplary embodiment of FIG. 1, the photodiode chip 105 is shown as mounted flat on the TO header. In other embodiments, the photodiode chip may be mounted at an angle with respect to the surface of the TO header so that any reflection from the surface of the photodiode chip is directed further away from the optical fiber. When the photodiode chip is mounted at an angle on the TO header surface, the chief ray of the optical signal should still be incident upon the active area of the photodiode.

Figure 2:
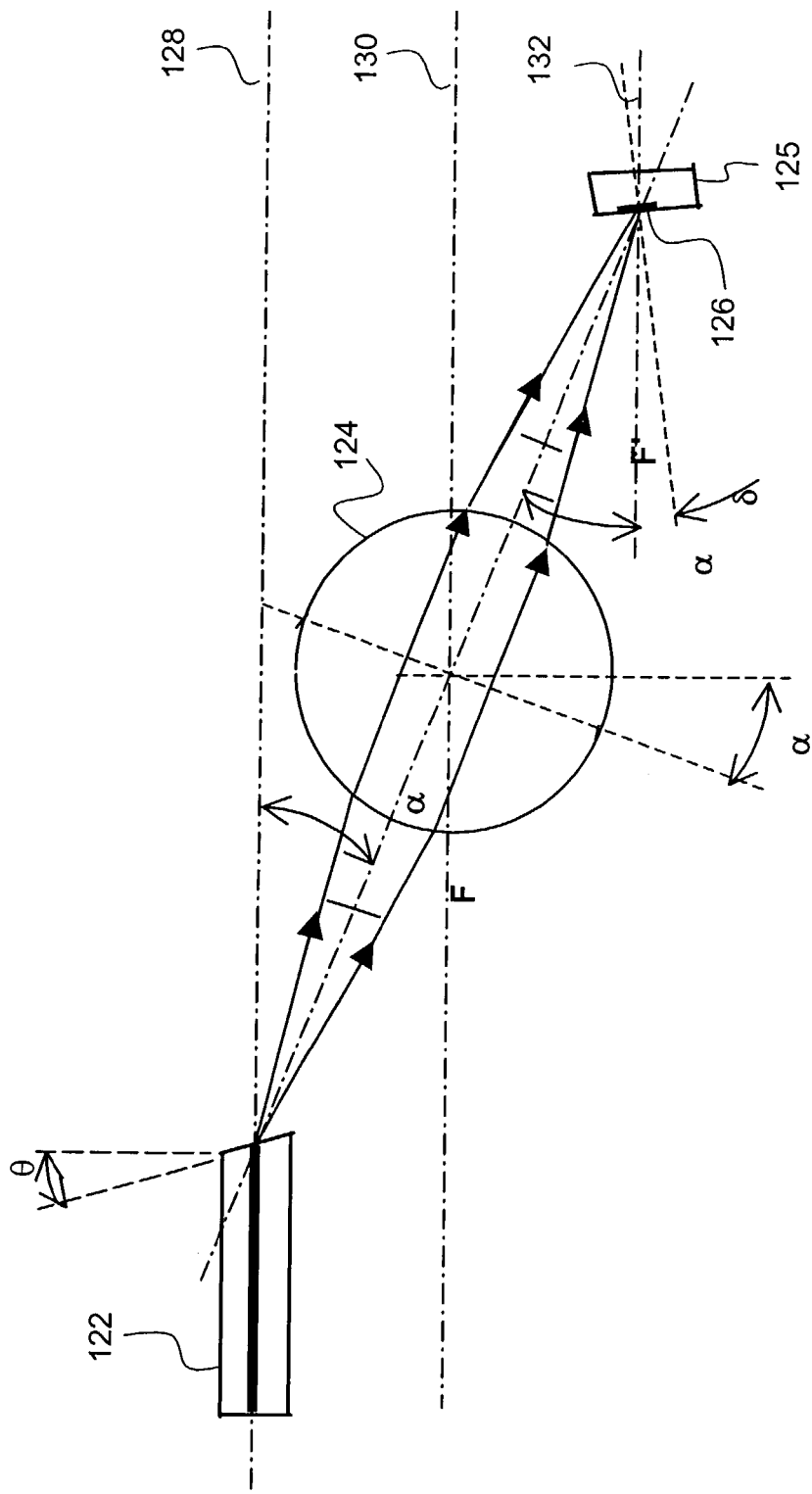
FIG. 2 is a schematic view of an optical interface between an optical fiber and a photodiode chip in another exemplary embodiment in accordance with aspects of the present invention.

FIG. 2 is a schematic drawing of an optical interface between an optical fiber 122 and a photodiode chip 125 in another exemplary embodiment in accordance with aspects of the present invention. The optical fiber 122 may be an end portion of a fiber optic cable or it may be a fiber stub enclosed in a receptacle (not shown). The fiber optic cable or the fiber stub for example may be SMF-28 or any other suitable optical fiber. When the optical fiber 122 is a fiber stub, this fiber stub and the receptacle together may also be referred to as an LC receptacle (or SC, MU or FC receptacle, for example, based on the type of the receptacle.).

The optical interface of FIG. 2 is similar to the optical interface of FIG. 1, except that a ball lens is used in FIG. 2. Further, FIG. 2 illustrates that the photodiode chip 125 is mounted on the TO header (not shown) at an angle δ so as to further reduce the return loss of the optical signal caused by the reflected signal.

The optical interface includes a ball lens 124 ("a microball lens") for focusing optical beam that passes therethrough. A chief ray passes through the center of the ball lens 124, and is substantially unbent as it travels from the optical fiber 122 to the photodiode chip 125. This way, the aberration (e.g., coma or astigmatism) that may be caused by passing the chief ray near the periphery of the ball lens 124 may be reduced.

In this embodiment, the optical fiber and the active area (i.e., detection area) are not co-axial. In fact, a TO header centerline 128 is substantially aligned with an axis of the optical fiber 122 (i.e., fiber core), but a photodiode centerline 132 that goes through the active area 126 of the photodiode chip 125 is offset from the To header centerline 128. Between the TO header centerline 128 and the photodiode centerline 132 is a lens centerline 130 that goes through the center of the lens 124.

The photodiode 125 for example is mounted on the TO header of the TO package, and the ball lens 124 may be mounted on a TO lens holder (not shown). The photodiode 125 may be substantially the same as the photodiode 105 of FIG. 1, and may be a PIN diode or an APD.

The optical fiber 122 is slanted (or cleaved) by angle theta (θ) at its output end. The slanted end of the optical fiber 122 is used to reduce the return loss created by reflection incident on the surface of the optical fiber end. The slant may be realized through polishing and/or cleaving. The optical signal being transmitted on the optical fiber 122, for example, may have a data rate of 10 Gbps or more. Due to the Snell's law, the chief ray of the optical beam is transmitted at an angle of α at the slanted optical fiber end and sent into the ball lens 124 mounted on the TO lens holder (not shown). According to the Snell's law, the angle α is determined as follows: α=arcsin [sin θ/n_core] where n_core=1.4677 at 1310 nm, and 1.4682 at 1550 nm, for example.

In order to obtain a proper offset from the centerline 128 of the TO header, the ball lens 124 is located off from the centerline 128 of the TO header. The ball lens 124 is not required to be tilted with an angle of α to the centerline to allow the bent chief ray through the lens center because the ball lens 124 is spherical and is symmetrical with respect to the center of the ball. When the magnification in this optical system is selected to be about 1:1, the centerline 132 of the active area 126 of the photodiode 125 is twice as far from the TO header centerline 128 as the lens centerline 130 that goes through the center of the ball lens 124. The incident chief ray with the same α angle illuminates the photodiode's active area 126 (size=~20 to 35 μm diameter). In other embodiments, the magnification may be between about 0.8 to about 1.5.

As illustrated in FIG. 2, the photodiode chip 125 is tilted to further lower the return loss without substantially decreasing coupling efficiency. For example, the photodiode chip 125 may be tilted at an angle δ with respect to the surface of the TO header. Hence, the photodiode incident angle can be (α+δ), which is larger than α. The photodiode chip may be tilted on the TO header for example by stamping the surface of the TO header.

In the exemplary embodiment illustrated in FIG. 2, the core of the optical fiber 122 is substantially aligned with the TO header centerline 128, and the lens centerline 130 is offset from the TO header centerline 128. In other embodiments, however, the lens centerline may be substantially aligned with the TO header centerline, and the core of the optical fiber may be offset by the same amount and in opposite direction (as the offset of the lens centerline 130 of FIG. 2) from the TO header centerline. In such case, the photodiode chip should also be moved to receive the chief ray on its active area. In other words, as long as the spatial relationship between the optical fiber, lens and photodiode is maintained, the TO header centerline may flexibly be substantially aligned with either the optical fiber core or the lens centerline.

Figure 3:
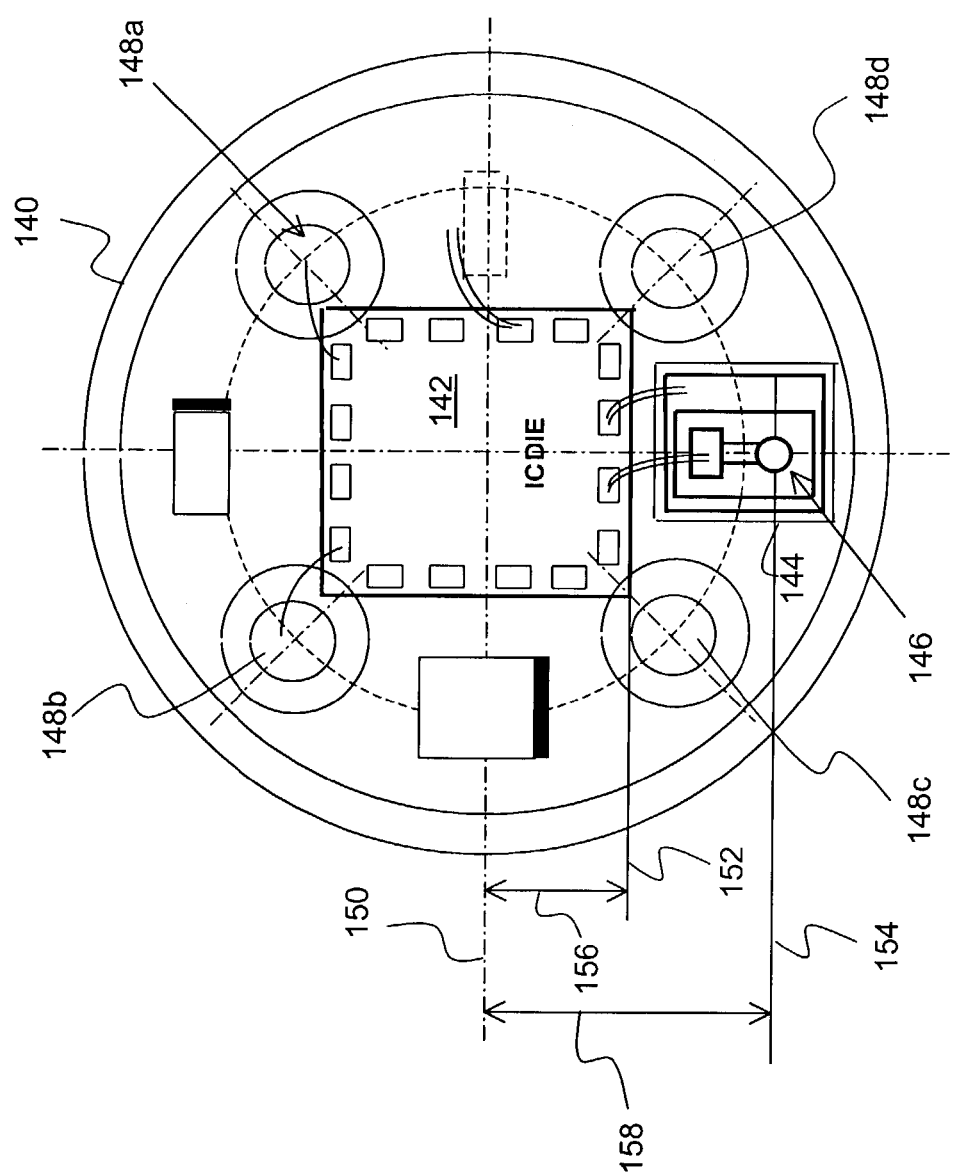
FIG. 3 is a top view of a TO package in an exemplary embodiment in accordance with aspects of the present invention.

FIG. 3 is a top view of a TO package 140 in an exemplary embodiment in accordance with aspects of the present invention. The TO package 140, for example, may be a TO-46 package for 10 Gbps fiber optic receivers. The TO package 140 includes an IC die 142, which may include a trans-impedance amplifier (TIA), for example. The IC die 142 may also include other circuitry in this and other embodiments.

It can be seen in FIG. 3 that the IC die 142 is located near the center of the TO package 140. Due to its location about the center, relatively short wire bond connections can be made between the IC die 142 and each of four TO header leads 148a-d. The leads 148a and 148b, for example, may be for differential output of the TO package 140. In addition, the lead 148c may be used to provide DC power supply to the TIA, for example. The lead 148d may be for measuring photodiode (PD) bias current for monitoring a photodiode 144.

The photodiode 144 has an active area 146 for detecting the optical signal. It can be seen that the centerline 154 of the photodiode active area 146 is offset from a centerline 150 of the TO package by a photodiode offset 158. It can also be seen in FIG. 3 that a centerline 152 of the lens is offset from the centerline 150 of the TO package by a lens offset 156. For example, when the photodiode offset 158 is about twice the lens offset 156, the TO package has a magnification ratio of approximately 1:1.

Figure 4:
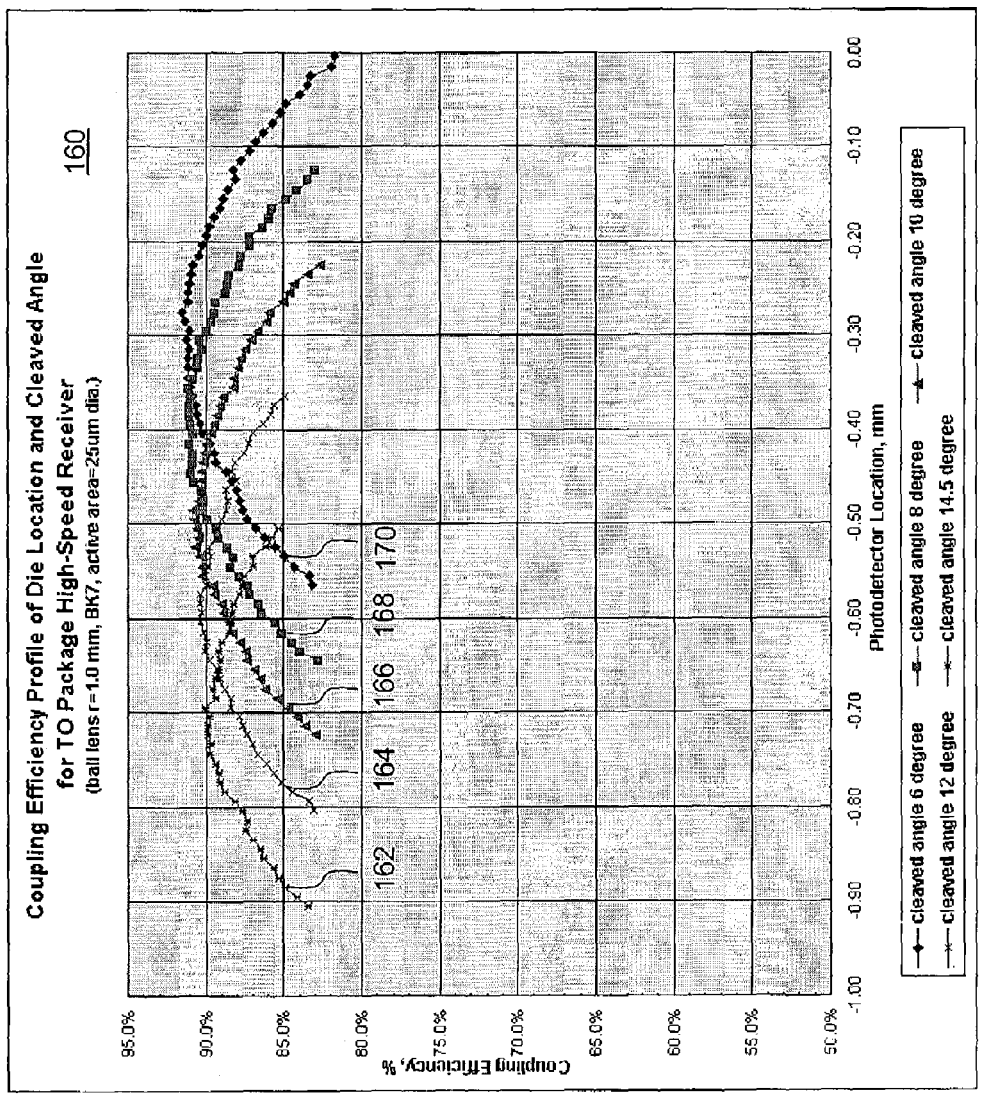
FIG. 4 is a graph that illustrates an optical coupling efficiency vs. photodiode chip location and optical fiber slanted end angle.

FIG. 4 is a graph 160 that illustrates an optical coupling efficiency vs. photodiode chip location and input fiber slant-end angle. The graph 160 has been generated for high speed receiver having a TO package with a ball lens with 1.0 mm radius and a photodiode with an active area of 25 μm diameter. An optical coupling efficiency may be realized by optimizing the input fiber slant-end angle to allow the chief ray of the input optical signal through the ball lens center to reduce the influence from lens aberration. The graph 160 has thereon five different plots, plot 162 for a cleaved angle of 14.5 degrees, plot 164 for a cleaved angle of 12 degrees, plot 166 for a cleaved angle of 10 degrees, plot 168 for a cleaved angle of 8 degrees and plot 170 for a cleaved angle of 6 degrees.

It can be seen in plot 170 that for an optical fiber having a cleaved angle of 6 degrees, an optimum coupling efficiency (approximately 92%) is realized when the active area of the photodiode is approximately 0.28 mm offset from the axis of the optical fiber core. For the optical fiber having a cleaved angle of 8 degrees, an optimum coupling efficiency (approximately 91%) is realized at the offset of approximately 0.4 mm as shown in plot 168. For a cleaved angle of 10 degrees, the optimum coupling efficiency (approximately 90%) is realized at the offset of approximately 0.5 mm as shown in plot 166. For cleaved angles of 12 and 14.5 degrees, respectively, the optimum coupling efficiency (approximately 90%) is realized at 0.6 mm and 0.7 mm as shown in plots 164 and 162, respectively.

Figure 5:
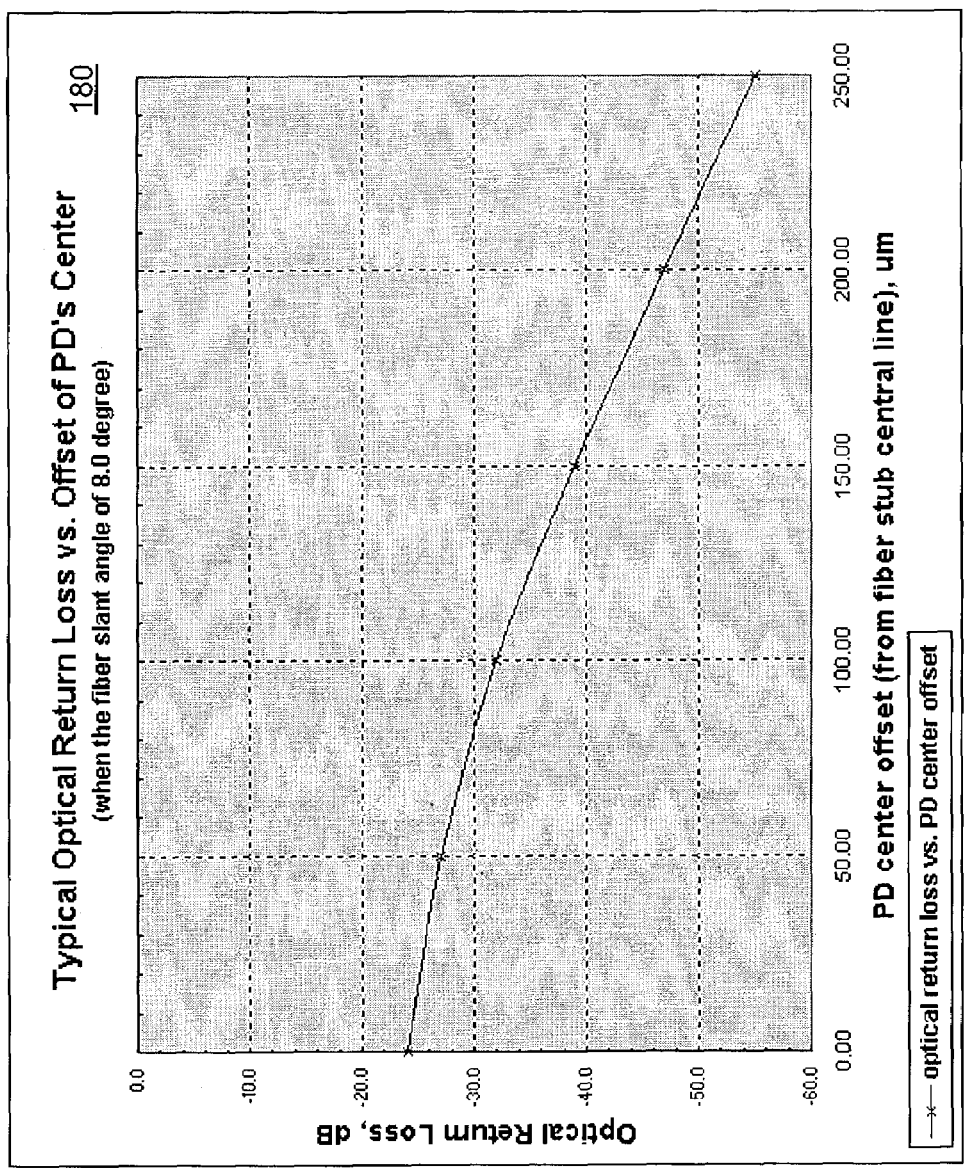
FIG. 5 is a graph that illustrates an optical return loss vs. offset from the photodiode's center when a ball lens is used.

FIG. 5 is a graph 180 that illustrates a typical optical return loss vs. offset the photodiode's center when the lens is a typical ball lens. It can be seen in the graph 180 that the optical return loss decreases as the photodiode center offset increases from about −24 dB at zero offset to about −55 dB at the offset of 250 μm.

Figure 6:
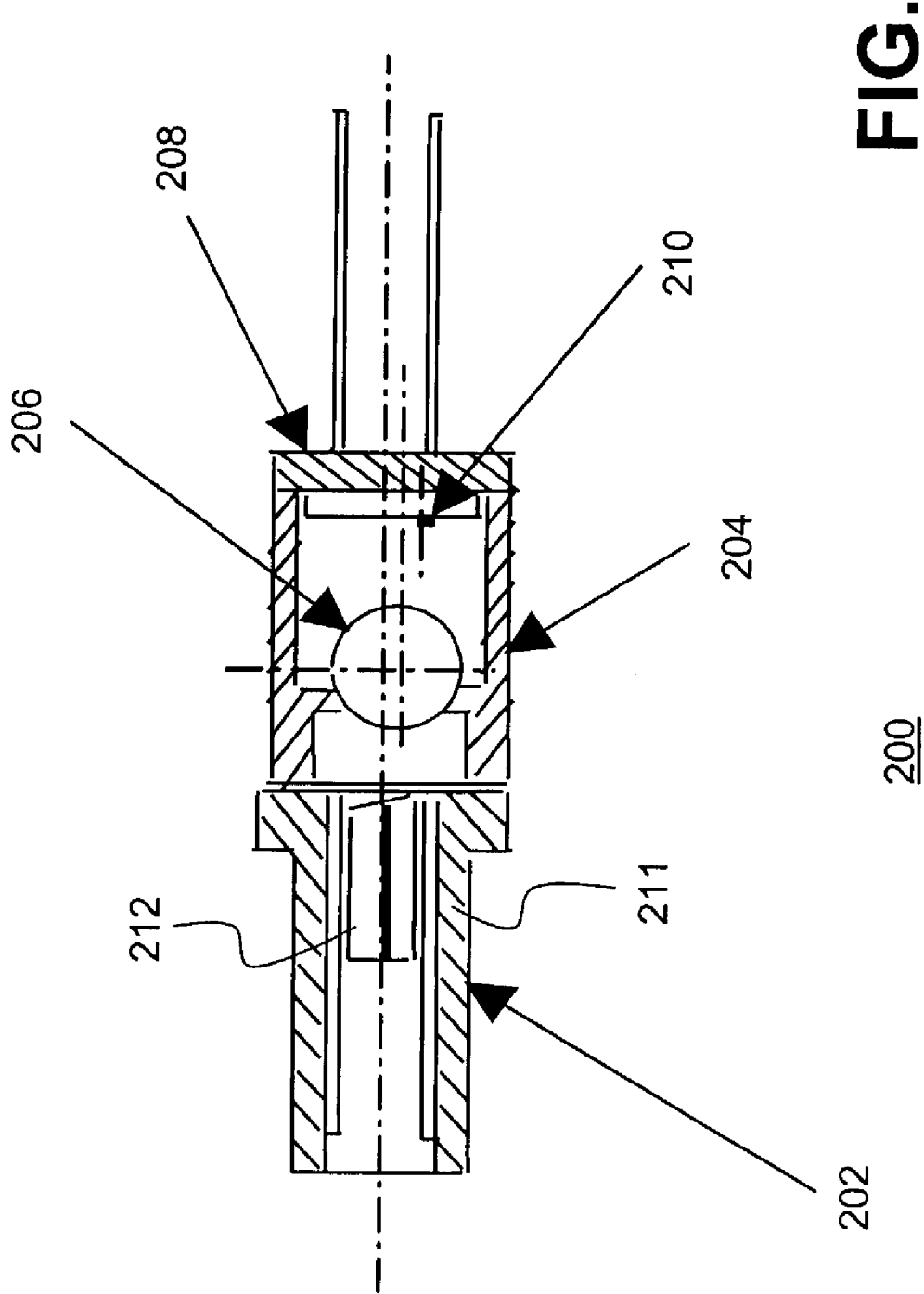
FIG. 6 is a cross-sectional view of an optical interface in receptacle TO package in an exemplary embodiment in accordance with aspects of the present invention.

FIG. 6 is a cross-sectional view of an optical interface in receptacle TO package 200 in an exemplary embodiment in accordance with aspects of the present invention. The receptacle TO package 200 may also be referred to as a receiver optical subassembly ("ROSA"). The receptacle TO package 200 includes an LC receptacle 202 that includes a receptacle 211 and an optical fiber (i.e., fiber stub) 212. The optical fiber 212 has a slanted end and may for example be an SMF-28. The LC receptacle 202 interfaces with a lens holder 204 holding a ball lens 206. In other embodiments, the ball lens 206 may be substituted by any other suitable positive (i.e., converging) lens for focusing an optical beam. The lens holder 204 is mounted on a TO header 208, which may have 3+1 leads or other pin layouts. A photodiode 210 is mounted on the TO header 208 at an offset from the center. The receptacle TO package 200, for example, may operate at 10 Gbps or faster bit rate. The embodiment illustrated on FIG. 6 may also be applied to a pigtail TO package of optic-fiber receiver.

FIG. 6 illustrates that the receptacle TO package 200 has the center of the ball lens 206 at an offset from the centerline of the TO header 208. The receptacle TO package 200 also illustrates that the optical fiber 212 is substantially aligned with the centerline of the TO header 208. This is not necessarily the case. In other embodiments, the center of the ball lens 206 may be substantially aligned with the centerline of the TO header 208 while the fiber stub is located at offset from the center of the TO header 208. Hence, as long as the relative positions between the slant-ended optical fiber and the ball lens are maintained, they can be flexibly located with respect to the TO header 208.

It will be appreciated by those of ordinary skill in the art that the invention can be embodied in other specific forms without departing from the spirit or essential character thereof. The present invention is therefore considered in all respects to be illustrative and not restrictive. The scope of the invention is indicated by the appended claims, and all changes that come within the meaning and range of equivalents thereof are intended to be embraced therein. For example, the optical interface in other embodiments may include two or more lenses. Further, the optical interface may also include one or more fold mirrors in the optical path to direct the optical beam to a desired location.

The invention claimed is:

1. An optical interface between an optical fiber and a photodiode chip, said optical fiber having an end, said optical interface comprising:
    a lens located such that a chief ray of an optical beam outputted at said end substantially overlaps an optical axis of the lens, and a center of the lens is on the optical axis,
    wherein an imaging focal point of the lens, where the optical beam is applied, is on an upper surface of the photodiode chip, and
    wherein the photodiode is offset from a centerline of the optical fiber.

2. The optical interface of claim 1, wherein said end of the optical fiber is slanted.

3. The optical interface of claim 1, wherein the lens comprises a ball lens.

4. The optical interface of claim 1, wherein the photodiode chip is mounted on a TO header at an offset from a centerline of the TO header, and wherein the chief ray is applied at an active area of the photodiode chip.

5. The optical interface of claim 4, wherein the centerline of the TO header is substantially aligned with a core of the optical fiber.

6. The optical interface of claim 4, wherein the centerline of the TO header is substantially aligned with a center of the lens.

7. The optical interface of claim 4, wherein a distance between the TO header centerline and a center of the active area of the photodiode chip is twice of a second distance between the TO header centerline and a center of the lens.

8. The optical interface of claim 1, further comprising a lens holder on which the lens is mounted.

9. The optical interface of claim 1, wherein the photodiode chip includes a PIN diode or an APD diode.

10. The optical interface of claim 1, wherein the photodiode chip is mounted on the TO header at an angle so as to reduce reflection of the optical beam back to the slanted end of the optical fiber.

11. An optical assembly comprising:
    an optical fiber having a core and an end;
    a photodiode chip having an active area; and
    a lens disposed between the optical fiber and the photodiode chip, the lens being located such that a chief ray of an optical beam outputted at said end substantially overlaps an optical axis of the lens, and a center of the lens is on the optical axis,
    wherein an imaging focal point of the lens, where the optical beam is applied, is on an upper surface of the photodiode chip, and
    wherein the photodiode is offset from a centerline of the optical fiber.

12. The optical assembly of claim 11, wherein said end of the optical fiber is slanted.

13. The optical assembly of claim 11, wherein the lens comprises a ball lens.

14. The optical assembly of claim 11, further comprising a TO header, wherein the photodiode chip is mounted on the TO header at an offset from a centerline of the TO header, and wherein the chief ray is applied at the active area of the photodiode chip.

15. The optical assembly of claim 14, wherein the centerline of the TO header is substantially aligned with the core of the optical fiber.

16. The optical assembly of claim 14, wherein the centerline of the TO header is substantially aligned with a center of the lens.

17. The optical assembly of claim 14, wherein a distance between the TO header centerline and a center of the active area of the photodiode chip is twice of a second distance between the TO header centerline and a center of the lens.

18. The optical assembly of claim 11, further comprising a lens holder on which the lens is mounted.

19. The optical assembly of claim 11, wherein the photodiode chip includes a PIN diode or an APD diode.

20. The optical assembly of claim 11, wherein the photodiode chip is mounted on the TO header at an angle so as to reduce reflection of the optical beam back to the slanted end of the optical fiber.

21. A method of using a photodiode chip having an active area to detect a chief ray of an optical beam outputted at an end of an optical fiber, said end having a surface, the method comprising:
    slanting said end of the optical fiber such that the chief ray is outputted at an angle with respect to the surface of said end;
    placing a lens such that the chief ray of the optical beam substantially overlaps an optical axis of the lens, and a center of the lens is on the optical axis; and
    placing the photodiode chip such that the chief ray can be incident on the active area of the photodiode chip substantially unbent,
    wherein an imaging focal point of the lens, where the optical beam is applied, is on an upper surface of the photodiode chip, and
    wherein the photodiode is offset from a centerline of the optical fiber.

22. The method of claim 21, wherein the lens comprises a ball lens.

23. In an optical assembly comprising an optical fiber and an opto-electronic device chip, a method of improving coupling efficiency between the optical fiber and the opto-electronic device chip, the method comprising:
    slanting an edge of the optical fiber that optically interfaces with the opto-electronic device chip; and
    placing the opto-electronic device chip such that a chief ray of an optical beam can travel between said slanted edge of the optical fiber and the opto-electronic device chip substantially unbent, wherein the chief ray substantially overlaps an optical axis of a lens disposed between the optical fiber and the opto-electronic device chip, and a center of the lens is on the optical axis, and wherein an imaging focal point of the lens, where the optical beam is applied, is on an upper surface of the opto-electronic device chip, and wherein the the opto-electronic device chip is offset from a centerline of the optical fiber.

24. The method of claim 23, wherein an off-axis aberration reduced by substantially overlapping the chief ray with the optical axis of the lens comprises at least one of coma and astigmatism.

25. The method of claim 23, wherein the opto-electronic device chip comprises a photodiode chip capable of detecting the optical beam outputted at said slanted edge of the optical fiber.

26. The optical interface of claim 1, wherein the optical beam is incident at substantially the center of the photodiode chip.

27. The optical interface of claim 1, wherein when the optical axis of the lens is aligned to match the chief ray which is obliquely incident, the photodiode chip is relatively aligned with an angle at the imaging focal point, wherein the photodiode chip is tilted in relation to a header to lower an optical return loss of the optical beam.

* * * * *